United States Patent [19]  [11] 4,145,299
Ford, Jr. et al.  [45] Mar. 20, 1979

[54] ELECTROGRAPHIC LIQUID DEVELOPERS CONTAINING AZO DYE MARKING PARTICLES DERIVED FROM 2,3-NAPHTHALENEDIOL OR DERIVATIVES THEREOF

[75] Inventors: John A. Ford, Jr.; Louis J. Rossi, both of Rochester; Domenic Santilli, Webster, all of N.Y.

[73] Assignee: Eastman Kodak Company, Rochester, N.Y.

[21] Appl. No.: 893,108

[22] Filed: Apr. 3, 1978

Related U.S. Application Data

[63] Continuation of Ser. No. 691,666, Jun. 1, 1976, abandoned.

[51] Int. Cl.$^2$ ............................................. G03G 9/12
[52] U.S. Cl. .................................. 252/62.1 L; 260/185
[58] Field of Search ............... 252/62.1 L, 62.1 R, 252/62.1 P; 260/185; 96/1 LY

[56] References Cited

U.S. PATENT DOCUMENTS

| 3,077,402 | 2/1963 | Blout et al. ..................... 260/185 X |
| 3,253,913 | 5/1966 | Smith et al. ................ 252/62.1 L X |
| 3,334,085 | 8/1967 | Geselbracht ........................ 260/185 |
| 3,781,208 | 12/1973 | Ueda et al. ...................... 252/62.1 L |

FOREIGN PATENT DOCUMENTS

| 926681 | 5/1973 | Canada. |
| 82774 | 7/1893 | Fed. Rep. of Germany ........... 260/185 |
| 1370197 | 10/1974 | United Kingdom. |

Primary Examiner—Harris A. Pitlick
Attorney, Agent, or Firm—William T. French

[57] ABSTRACT

An electrographic liquid developer comprising a carrier liquid and a marking particle which comprises a dye compound having the formula:

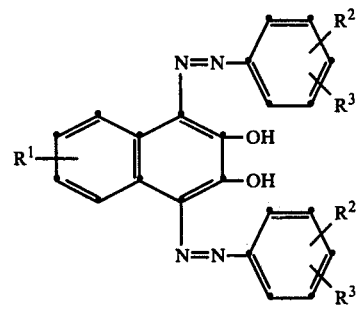

wherein:
$R^1$ is H, COOH, $CONH_2$, $-SO_2NH_2$ or $-SO_3M$ where M is $Na^+$ or $NH_4$;
$R^2$ is a lower alkoxy radical, $-OCH_2CONH_2$, or

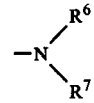

where each of $R^6$ and $R^7$ is a lower alkyl radical; and $R^3$ is H, a lower alkyl radical, a lower alkoxy radical or $NO_2$.

21 Claims, 1 Drawing Figure

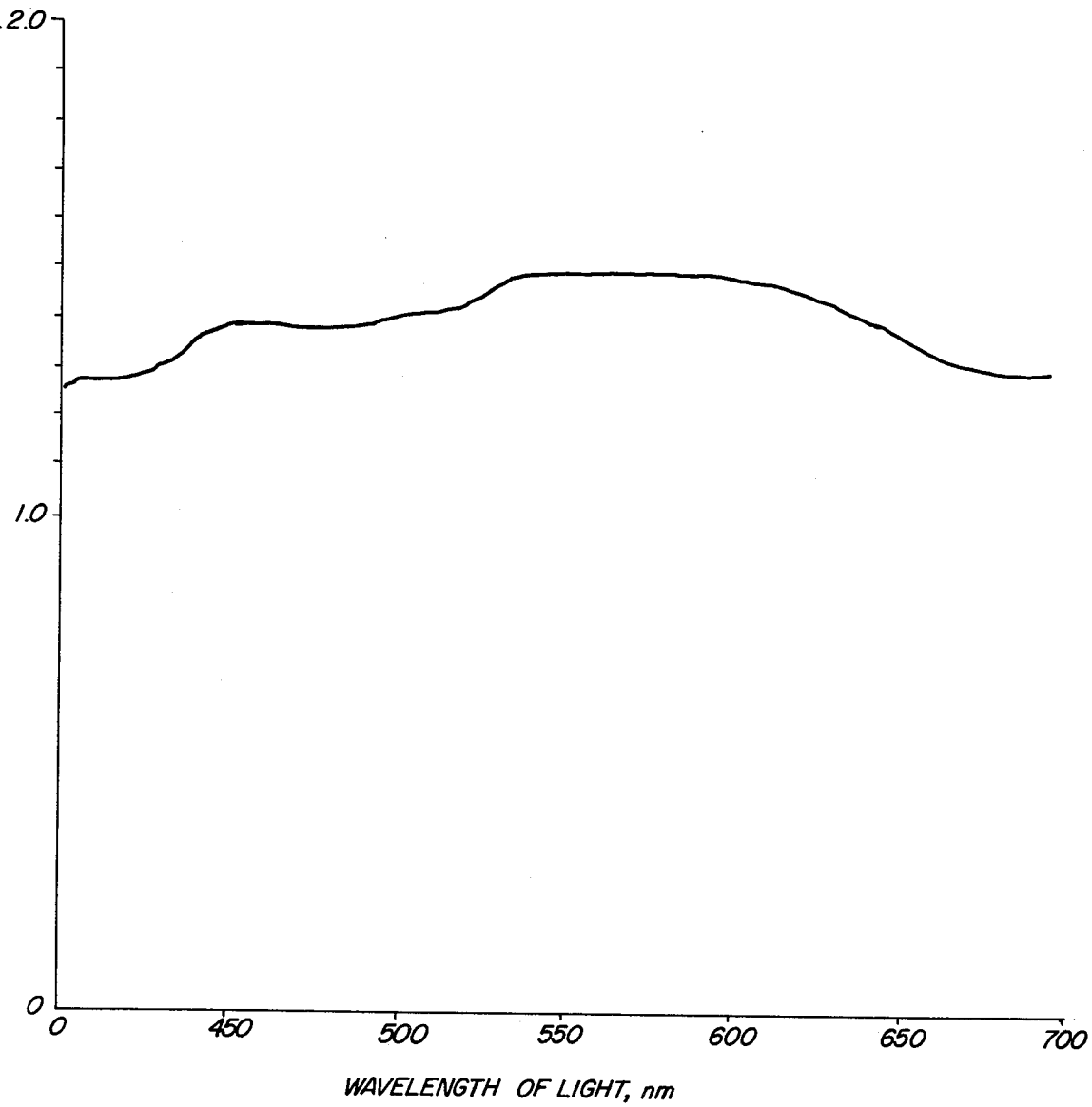

ELECTROGRAPHIC LIQUID DEVELOPERS CONTAINING AZO DYE MARKING PARTICLES DERIVED FROM 2,3-NAPHTHALENEDIOL OR DERIVATIVES THEREOF

This is a continuation of application Ser. No. 691,666, filed June 1, 1976 now abandoned.

FIELD OF THE INVENTION

This invention relates to electrography and particularly to electrographic liquid developers having marking particles that comprise dyes which are the reaction product of 2,3-naphthalenediol and certain diazonium salts.

BACKGROUND OF THE INVENTION

Insoluble dyes have been used as pigments in prior-art electrographic liquid developers. However, processes using such prior-art developers have generally suffered from the poor dispersion stability of such developers and/or poor light stability of the developed image. Prior-art processes which use carbon as the pigment in electrographic liquid developers yield black developed images with good visual density at 550 nm. but have generally suffered from such problems as batch-to-batch nonuniformity and yield poor continuous tone images on print materials such as vesicular elements. Thus, there is a continuing need for insoluble dyes which can be used as pigments in electrographic liquid developers to provide such developers with improved dispersion stability and to provide developed images having improved stability to light. In particular, there is a need to provide an insoluble dye having the desirable neutral density color characteristics of carbon without the objectionable problems of carbon when used in liquid developers.

The azo dyes of the present invention can be used to make electrographic liquid developers which have good dispersion stability, which yield good light stability of developed images, and which can provide good continuous tone images. Electrographic liquid developers made using the azo dyes of the present invention further provide high-quality developed images having low contrast and high resolution.

Various azo dyes have been used in making electrographic liquid developers. Included among such azo dyes are those containing naphthalene and hydroxynaphthalene groups such as those described in U.S. Pat. No. 3,781,208 and in Canadian Pat. No. 926,681. The azo dyes used in the liquid developers of the present invention differ structurally from those described above and generally exhibit blue or neutral density coloration.

SUMMARY OF THE INVENTION

The present invention provides electrographic liquid developers comprising a liquid carrier having a dielectric constant of less than about 3 and having a volume resistivity of greater than about $10^{10}$ ohm-cm., and marking particles comprising dyes which are formed by coupling diazonium salts with 2,3-naphthalenediol derivatives. Preferred dyes generally have a structure according to the following formula:

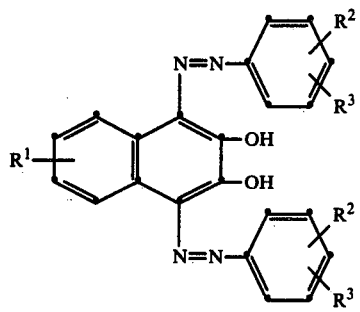

wherein:
$R^1$ is H, COOH, CONH$_2$, —SO$_2$NH$_2$ or —SO$_3$M where M is Na$^+$, NH$_4^+$ or like cations;

$R^2$ is a lower alkoxy radical having from 1 to about 4 carbon atoms (such as, for example, —OCH$_3$, —OC$_2$H$_5$, n—C$_3$H$_7$O—, etc.), —OCH$_2$CONH$_2$ and

where each of $R^6$ and $R^7$ is selected from lower alkyl radicals having 1-4 carbon atoms including substituted lower alkyl radicals such as —C$_2$H$_4$OH, —C$_2$H$_4$SO$_3$M, etc.; and $R^3$ is H, NO$_2$, halogen, or a lower alkyl radical or lower alkoxy radical having from 1 to about 4 carbon atoms including substituted such radicals.

The electrographic liquid developers of this invention exhibit good dispersion stability and yield high-quality developed images having low contrast, high resolution and stability to light.

Certain of the above dyes exhibit a unique spectral response. These dyes absorb radiation relatively uniformly in the range of from about 400 nm. to about 700 nm. and therefore exhibit a neutral density coloration. The dyes exhibiting this neutral density coloration are the naphthalenediol disazo dyes of Formula I wherein $R^4$ is an arylazo group and $R^2$ is —OCH$_2$CONH$_2$ or a lower alkoxy group having from 1-4 carbon atoms.

A preferred embodiment of the present invention provides liquid developers having marking particles comprising these neutral density dyes. Such developers do not require color balancing with multiple dyes to provide the neutral density images usually desirable in copying documents.

The FIGURE illustrates a spectral response curve of certain preferred dye compounds of this invention that exhibit substantially neutral density coloration.

DETAILED DESCRIPTION OF THE INVENTION

In accordance with the present invention, electrographic liquid developers are provided. The developers comprise a liquid carrier and marking particles which comprise a dye made by coupling a diazonium salt with a 2,3-naphthalenediol derivative.

Carrier liquids which may be used to form such developers can be selected from a wide variety of materials. Preferably, the liquid has a low dielectric constant and a very high electrical resistance such that it will not disturb or destroy the electrostatic latent image. In general, useful carrier liquids should have a dielectric constant of less than about 3, should have a volume resistivity of greater than about $10^{10}$ ohm-cm., and should be stable under a variety of conditions. Suitable carrier liquids include halogenated hydrocarbon solvents, for example, fluorinated lower alkanes, such as trichloromonofluoromethane, trichlorotrifluoroethane, etc., having a typical boiling range of from about 2° C. to about 55° C. Other hydrocarbon solvents are useful, such as isoparaffinic hydrocarbons having a boiling range of from about 145° C. to about 185° C., such as Isopar G (Humble Oil & Refining Co.) or cyclohydrocarbons having a major aromatic component and also having a boiling range of from about 145° C. to about 185° C., such as Solvesso 100 (Humble Oil & Refining Co.). Additional useful carrier liquids include polysiloxanes, odorless mineral spirits, octane, cyclohexane, etc.

The marking particles for the developers of this invention can be provided simply by grinding the pigments to the appropriate size and then marking the developer by dispersing the pigment powder in a carrier liquid without the addition of a resinous binder and/or charge control agent. A developer which does not contain a binder material would produce developed images which were not fixed. Accordingly, it would be necessary to overcoat such images by spraying with a lacquer composition in order to hold the pigment particles in place.

Dyes useful in the practice of this invention are provided by coupling diazonium salts with 2,3-naphthalenediol derivatives according to the following reaction:

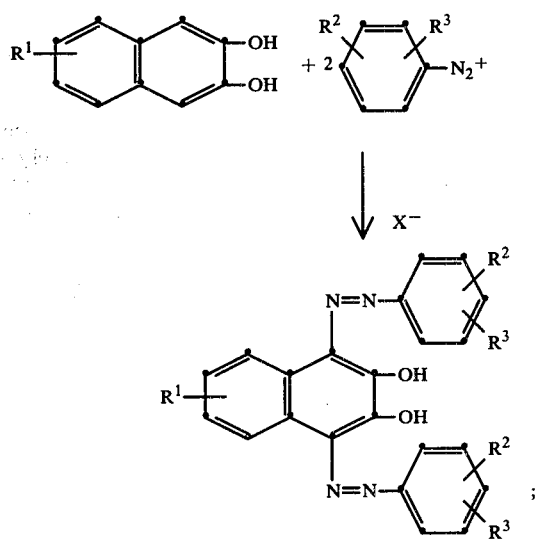

wherein $X^-$ is an anion and the R's are the same as defined hereinabove.

As used herein, the terms "lower alkyl radical" and "lower alkoxy radicals" include those such radicals having from 1 to about 4 carbon atoms in the unsubstituted radical, and also include substituted such radicals in which one or more hydrogen atoms have been replaced by an OH, $SO_3M$ (where M is $Na^+$, $NH_4^+$, etc.), a halogen, or other similar substituents.

Dyes that are particularly useful in the practice of this invention include, for example:

1. 1,4-bis[p-(N-ethyl-N-2-hydroxyethylamino)-phenylazo]-2,3-naphthalenediol;
2. 1,4-bis[4-(N-ethyl-N-2-hydroxyethylamino)-phenylazo]-2,3-dihydroxy-7-naphthalenesulfonic acid ammonium salt;
3. 1,4-bis[4-(N-ethyl-N-2-sulfoethylamino)-2-methylphenylazo]-2,3-naphthalenediol disodium salt;
4. 2,3-dihydroxy-1,4-bis[4-(N-ethyl-N-2-sulfoethylamino)-2-methylphenylazo]-7-naphthalenesulfonamide disodium salt;
5. 1,4-bis(p-anisylazo)-2,3-naphthalenediol;
6. 1,4-bis(o-anisylazo)-2,3-naphthalenediol;
7. 1,4-bis(p-ethoxyphenylazo)-2,3-naphthalenediol;
8. 1,4-bis(4-n-propoxyphenylazo)-2,3-naphthalenediol;
9. 1,4-bis(p-anisylazo)-2,3-dihydroxynaphthalenesulfonic acid sodium salt;
10. 1,4-bis(o-anisylazo)-2,3-dihydroxynaphthalenesulfonic acid sodium salt;
11. 1,4-bis(4-anisylazo)-2,3-dihydroxy-6-naphthalenesulfonamide;
12. 1,4-bis(4-carbamoylmethoxyphenylazo)-2,3-naphthalenediol;
13. 1,4-bis(2-nitro-4-anisylazo)-2,3-naphthalenediol; and
14. 1,4-bis(5-nitro-2-anisylazo)-2,3-naphthalenediol.

Generally it is desirable to include a resinous material for the marking particle to facilitate binding of the particle to the surface to be developed. Suitable resinous materials used in the present developers appear to form a coating around each colorant particle and thus also faciliate dispersion of the colorants in the carrier liquid. Useful resins can be selected from a wide variety of substances. The following are illustrative of suitable materials: rosins, including hydrogenated rosins and esters of hydrogenated rosins; alkyl methacrylate copolymers having from 2-5 carbon atoms in each alkyl moiety, such as isobutyl methacrylate and normal butyl methacrylate copolymers, etc.; phenolic resins including modified phenolic resins such as phenol formaldehyde resins; pentaerythritol phthalate; coumaronein-dene resins; ester gum resins; vegetable oil polyamides; alkyd resins, including modified alkyds such as soya oil-modified and linseed oil-modified alkyds, phthalic, maleic and styrenated alkyds, etc.; and the like.

In addition, the electrostatic charge polarity of the marking particles of the present invention can be enhanced or altered by the addition of suitable charge control agents if so desired. A variety of materials can be used as charge control agents. Illustrative of suitable charge agents would be the polyoxyethylated alkyl surfactants such as polyoxyethylated alkylamine, polyoxyethylene palmitate, polyoxyethylene stearate, etc. Other useful materials are magnesium and heavier metal soaps of fatty and aromatic acids as described by Beyer in U.S. Pat. No. 3,417,019. Useful metal soaps include cobalt naphthenate, magnesium naphthenate and manganese naphthenate, zinc resinate, calcium naphthenate, zinc linoleate, aluminum resinate, isopropyltitanium stearate, aluminum stearate and others, many of which are also described in U.S. Pat. No. 3,259,581. Typically, the amount of such materials used is less than about 2% by weight based on the weight of toner. In certain instances, the resinous binder per se can function as the charge control agent, as can the colorant.

Developers are generally prepared by grinding or ball-milling one of the pigments with a suitable polymer solution to make a concentrate and diluting this concentrate with an insulating carrier liquid. The resultant developer is in the form of a carrier liquid having dispersed therein marking particles comprised of the pigments of this invention and a suitable resinous material. Typical developer compositions comprising the pigments of this invention will contain the pigments in a concentration of from about 0.01 to about 1.0 gram per liter. When a resin binder is used, the pigment-to-binder weight ratio can vary from about 1:20 to about 2:1.

The invention is further illustrated by the examples which follow.

EXAMPLE 1

Preparation of 1,4-bis[p-(N-ethyl-N-2-hydroxyethylamino)phenylazo]-2,3-naphthalenediol

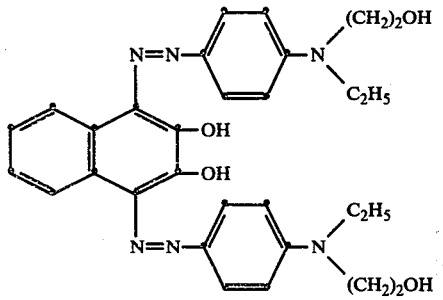

A solution of 0.200 mole of p-(N-ethyl-N-2-hydroxyethylamino)benzenediazonium chloride (made as in the preceding procedure using twice the amount of PDA, sodium nitrite, hydrochloric acid and water) was added dropwise with stirring at 0°–5° C. to a solution of 15.9 g. (0.0994 mole) of 2,3-naphthalenediol, 400 ml. of pyridine and 150 ml. of aqueous 28% ammonia. The mixture was stirred for 1½ hr. after completion of the addition. The solid was collected, washed with methanol and then water, and dried in vacuum at 45° C. to give 42.3 g. of green product, m.p. 240° C. Recrystallization from 400 ml. of pyridine gave 33.2 g. (61.6%) of green crystals, m.p. 247° C. (dec.), $\lambda_{max}^{DMF}$ (log E) 614 nm. (4.82), 657 nm. (4.87).

Anal. calc'd. for $C_{30}H_{34}N_6O_4$: C, 66.6; H, 6.28; N, 15.5. Found: C, 66.2; H, 6.3; N, 15.3.

EXAMPLE 2

Preparation of 1,4-bis[4-(N-ethyl-N-2-hydroxyethylamino)phenylazo]-2,3-dihydroxy-7-naphthalenesulfonic acid ammonium salt

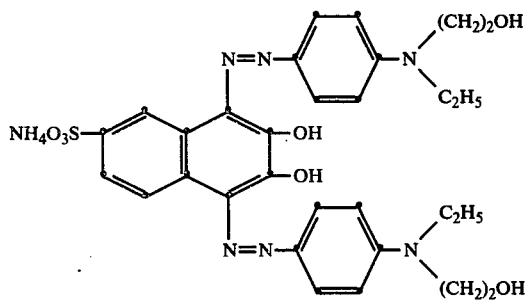

A solution of 34.5 g. (0.100 mole) of 2,3-diacetoxy-7-naphthalenesulfonic acid sodium salt (see Example 5), 40.0 g. (1.00 mole) of sodium hydroxide and 700 ml. of water was stirred for 2 hr. at 25°–30° C., cooled and treated dropwise at 5°–10° C. with a solution of 0.200 mole of p-(N-ethyl-N-2-hydroxyethylamino)benzenediazonium chloride made as in the preceding procedure. The mixture was stirred overnight. The solid was collected, pressed as dry as possible, dissolved in 1 l. of water and treated dropwise with a hot solution of 28.7 g. (0.100 mole) of 1,2,3-triphenylguanidine, 250 ml. of ethyl alcohol, 15 ml. of glacial acetic acid and 15 ml. of water. After 1 hr., the solid was collected, washed with water and vacuum-dried at 35° C. to give 71.8 g. of a mixture of blue and violet dyes. It was stirred for 1 hr. in 760 ml. of methanol, collected, washed with 500 ml. of methanol and dried to give 25.1 g., m.p. 238°–239° C. (Thin-layer chromatography of this material showed only the blue component.) Stirring this material for 1 hr. at reflux with a solution of 2.5 g. (0.032 mole) of ammonium acetate in 350 ml. of ethyl alcohol, collection (without cooling) of the solid, washing with ethyl alcohol and vacuum-drying at 45° C. gave 20.5 g. (32.1%) of blue powder.

Anal. Calc'd. for $C_{30}H_{37}N_7O_7S$: C, 56.4; H, 5.78; N, 15.3; S, 5.00. Found: C, 58.8; H, 5.6; N, 13.2; S, 4.4.

EXAMPLE 3

Preparation of 2,3-diacetoxy-7-naphthalenesulfonic acid sodium salt

A mixture of 72.3 g. (0.276 mole) of 2,3-dihydroxy-7-naphthalenesulfonic acid sodium salt, 360 ml. of acetic anhydride and 5 drops of concentrated sulfuric acid was stirred 8 hr. on a steam bath and cooled overnight to room temperature. The solid was collected, washed with acetic anhydride, pressed as dry as possible, dissolved in 400 ml. of water, mixed with 500 ml. of 20% sodium chloride solution and allowed to stand overnight. The solid was collected, washed with 20% sodium chloride and dried to give 69.9 g. (73.1%) of colorless crystals, m.p. 270°–300° C. (dec.).

Anal. calc'd. for $C_{14}H_{11}NaO_7S$: C, 48.6; H, 3.18; Na, 6.65; S, 9.25. Found: C, 45.7; H, 3.3; Na, 6.4; S, 8.7.

EXAMPLE 4

Preparation of 2,3-diacetoxy-7-naphthalenesulfonyl chloride

A mixture of 14.4 g. (0.0416 mole) of 2,3-diacetoxy-7-naphthalenesulfonic acid sodium salt, 150 ml. of thionyl chloride and 1 ml. of DMF was stirred 1 hr. at room temperature and 1 hr. at reflux, cooled to room temperature and poured into 1 l. of petroleum ether. The solid was collected, washed with petroleum ether and dried to give 11.3 g. (79.9%) of cream-colored product, m.p. 158°–167° C.

Anal. calc'd. for $C_{14}H_{11}ClO_6S$: C, 49.0; H, 3.21; Cl, 10.4; S, 9.33. Found: C, 48.3; H, 3.4; Cl, 9.8; S, 10.1.

EXAMPLE 5

Preparation of 2,3-dihydroxy-7-naphthalenesulfonamide

A solution of 20.0 g. (0.0583 mole) of 2,3-diacetoxy-7-naphthalenesulfonyl chloride in 300 ml. of tetrahydrofuran was treated with 8.7 ml. (0.13 mole) of aqueous 28% ammonia. The solid (9.9 g., infrared spectrum identical with that of 6,7-diacetoxy-2-naphthalenesulfonic acid sodium salt) was removed by filtration and the filtrate evaporated to dryness. The residue was dissolved in 150 ml. of ethyl acetate. The residue from evaporation of the dried (anhydrous sodium sulfate) solution was slurried with four 100-ml. portions of ether and then dissolved in 150 ml. of 3A alcohol. The solution was saturated with hydrogen chloride, allowed to stand overnight, and then concentrated at the water pump to give 9.7 g. of colorless residue. Recrystallization from 50 ml. of water gave 5.1 g. (37%) of pale violet solid, m.p. 218°–228° C.

Anal. calc'd. for $C_{10}H_9NO_4S$: C, 50.2; H, 3.77; N, 5.85; S, 13.4. Found: C, 50.2; H, 4.1; N, 5.3; S, 13.0.

EXAMPLE 6

Preparation of 1,4-bis[4-(N-ethyl-N-2-sulfoethylamino)-2-methylphenylazo]-2,3-naphthalenediol disodium salt

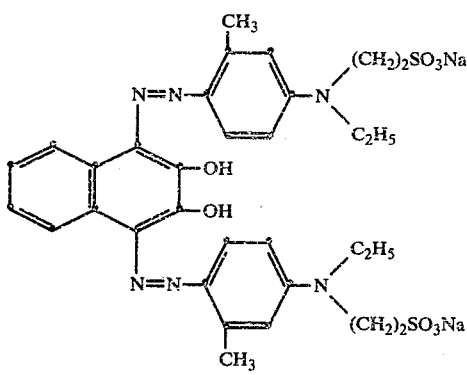

A solution of 6.4 g. (0.093 mole) of sodium nitrite in 15 ml. of water was added dropwise with stirring at 0°–5° C. to a solution of 24 g. (0.093 mole) of (N-ethyl-N-2-sulfoethylamino)-O-toluidine, 27 ml. (0.32 mole) of concentrated hydrochloric acid and 100 ml. of water. The resulting dark solution was added dropwise with stirring at 0°–5° C. to a solution of 7.5 g. (0.047 mole) of 2,3-naphthalenediol, 20 g. (0.50 mole) of sodium hydroxide and 500 ml. of water. The mixture was stirred overnight and filtered from a small amount of solid. The filtrate was diluted to 800 ml. with water and treated dropwise with stirring with a hot solution of 15 g. (0.052 mole) of 1,2,3-triphenylguanidine, 250 ml. of 3A alcohol, 10 ml. of glacial acetic acid and 10 ml. of water. The solid was collected and shown by TLC to be a mixture of blue and violet dyes. The filtrate was treated with a second portion of 1,2,3-triphenylguanidine acetate made as described above. The 8.9 g. of gummy solid which resulted was stirred at reflux for 1 hr. with a solution of 2.0 g. (0.024 mole) of sodium acetate in 250 ml. of ethyl alcohol. The solid was collected, washed with ethyl alcohol and dried at 60° C. to give 6.4 g. (18%) of black powder. TLC showed a trace of violet contaminant.

Anal. calc'd. for $C_{32}H_{36}N_6Na_2O_8S_2$: C, 51.8; H, 4.85; N, 11.3; Na, 6.20; S, 8.62. Found: C, 49.3; H, 4.8; N, 12.0; Na, 7.9; S, 8.0.

EXAMPLE 7

Preparation of 2,3-dihydroxy-1,4-bis[4-(N-ethyl-N-2-sulfoethylamino)-2-methylphenylazo]-7-naphthalenesulfonamide disodium salt

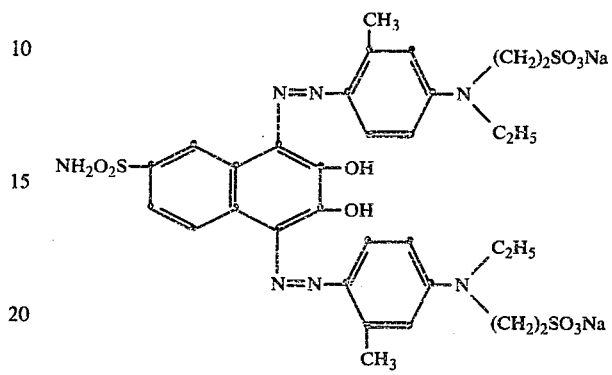

A solution of 0.042 mole of diazonium salt made as in the preceding procedure from 10.8 g. of D99E, 10.5 ml. of concentrated hydrochloric acid, 2.9 g. of sodium nitrite and 35 ml. of water was added dropwise with stirring at 0°–5° C. to a solution of 5.0 g. (0.021 mole) of 2,3-dihydroxy-7-naphthalenesulfonamide in 150 ml. of 2N sodium hydroxide. The mixture was stirred overnight and then treated dropwise with a hot solution of 12.1 g. (0.0420 mole) of 1,2,3-triphenylguanidine, 100 ml. of ethyl alcohol, 10 ml. of acetic acid and 10 ml. of water, acidified to pH 4 with acetic acid and allowed to stand overnight. The solid was collected, washed with 300 ml. of water and vacuum-dried at 40° C. The 16.1 g. of blue product was stirred at reflux for 1 hr. with a solution of 3.5 g. (0.043 mole) of sodium acetate in 350 ml. of ethyl alcohol. The solid was collected, washed with ethyl alcohol and vacuum-dried at 40° C. to give 6.9 g. (42%).

EXAMPLE 8

Preparation of 1,4-bis(p-anisylazo)-2,3-naphthalenediol

To a stirred solution of 24.6 g. (0.200 mole) of p-anisidine, 50 ml. (0.60 mole) of concentrated hydrochloric acid and 100 ml. of water was added dropwise at 0°–5° C. a solution of 13.8 g. (0.200 mole) of sodium nitrite in 30 ml. of water. The diazonium salt solution was stirred for 10 min. after the final addition, then was added dropwise to a solution of 15.9 g. (0.0944 mole) of 2,3-naphthalenediol, 110 ml. of 28% aqueous ammonia and 350 ml. of pyridine at 5°–10° C. The mixture was stirred for 1½ hr. after completion of the addition. The solid was collected, washed with methanol and then water, and dried to give 26.7 g. of crude product, m.p. 245°–251° C. Recrystallization from pyridine gave 20.7 g. (48.5%) of dark solid, m.p. 258°–260° C.

EXAMPLES 9–17

Dyes having Composition Nos. 8–16 listed hereinabove were prepared by a procedure similar to that described in Example 10. The substituents as described by Formula I are given in Table 1 below.

Table 1

| Example No. | Composition No. | Substituents (See Formula I) | | | Melting Point °C. |
|---|---|---|---|---|---|
| | | $R^1$ | $R^2$ | $R^3$ | |
| 10 | 7* | H | p-CH$_3$O- | H | 258–260 |
| 11 | 8 | H | o-CH$_3$O- | H | 271–273 |
| 12 | 9 | H | p-C$_2$H$_5$O- | H | 255–257 |
| 13 | 10 | H | p-n-C$_3$H$_7$O- | H | 242–244 |
| 14 | 11 | 6-SO$_3$ Na | p-CH$_3$O- | H | >385 |
| 15 | 12 | 6-SO$_3$ Na | o-CH$_3$O- | H | >385 |
| 16 | 13 | 6-SO$_2$ NH$_2$ | 4-OCH$_3$ | H | 258–260 |
| 17 | 14 | H | 4-OCH$_2$CONH$_2$ | H | 301–303 |
| 18 | 15 | H | 4-OCH$_3$ | 2-NO$_2$ | 308–312 |
| 19 | 16 | H | 2-OCH$_3$ | 5-NO$_2$ | 331–333 |

*Example 10

The materials defined hereinbelow are used in the following examples:

| | |
|---|---|
| Isopar-G: | a liquid mixture of aliphatic hydrocarbons obtained from Humble Oil & Refining Co. |
| Beckosol 7: | a soya-modified alkyd resin containing 42% phthalic anhydride and 41% soya fatty acids from Reichold Chemical Co. |
| Solvesso 100: | a hydrocarbon solvent consisting of alkylbenzenes from Esso Standard Oil Co. |
| VT: | vinyl toluene |
| LM: | lauryl methacrylate |
| LiM: | lithium methacrylate |
| MA: | methacrylic acid |
| EA: | ethyl acrylate |
| EM: | ethyl methacrylate |
| LiSEM: | lithium sulfoethyl methacrylate |
| t-BuS: | tertiary butyl styrene |
| VT/LM/LiM/MA: | a mixture of 56% VT, 40% LM, 3.6% LiM and 0.4% MA solids by weight |
| EA/EM/LM/LiSEM: | a mixture of 46% EA, 26% EM, 16% LM and 12% LiSEM solids by weight |
| t-BuS/LM/LiM/MA: | a mixture of 56% t-BuS, 40% LM, 3.6% LiM and 0.4% MA solids by weight |

EXAMPLE 18

To 13.5 ml. VT/LM/LiM/MA solution (7% Solvesso 100 solution) was added 0.7 g. of pigment of Example 9. The mixture was ball-milled for a week. To 3.5 g. of the concentrate was added 0.7 g. EA/EM/LM/LiSEM solution (14% Solvesso 100 solution). The mixture was then dispersed in 500 ml. Isopar-G by ultrasonic means. The resulting developer, when utilized to develop electrostatic charge pattern, yielded good-quality, high-resolution images. Duplicates of such images obtained on diazo vesicular materials exhibited low contrast and excellent continuous tone.

EXAMPLE 19

With 15.6 ml. VT/LM/LiM/MA solution (7% solution as above) was mixed 0.8 g. of pigment of Example 8. The mixture was then treated as in Example 20. The quality of the first- and second-generation images was similar to the quality of images of Example 20.

EXAMPLE 20

To 15.6 ml. VT/LM/LiM/MA solution (7% Solvesso 100 solution) was added 0.8 g. of pigment of Example 4. The mixture was treated as in Example 20. The developed images were of good quality and exhibited high resolution. The images from the second-generation process also show good continuous tone.

EXAMPLE 21

With 30 ml. VT/LM/LiM/MA (7% Solvesso 100 solution), 2.0 g. of the pigment of Example 3 were mixed and ball-milled for 10 days. A developer was then prepared by adding to 2.98 g. of the concentration 0.7 g. binder solution EA/EM/LM/LiSEM (14% Solvesso 100 solution) and dispersing the mixture in 500 ml. of Isopar-G by ultrasonic means. The developer was made up of particles less than 1$\mu$ in size and yielded high-quality images. The second-generation process exhibited the same characteristics as Example 20.

EXAMPLE 22

To 30 ml. VT/LM/LiM/MA 7% solution, 2.0 g. of the pigment of Example 3 was added and ball-milled for 15 days. A developer was then prepared by adding 0.7 g. Beckosol-7 (14% Solvesso 100 solution) and 0.15 g. cobalt naphthanate to 2.98 g. concentrate and dispersing the mixture in 500 ml. Isopar-G ultrasonic means. Images from such a developer exhibited high resolution, high density and very high quality. Continuous tone and low contrast were again the properties of the second-generation images.

EXAMPLE 23

In 83.4 g. t-BuS/LM/LiM/MA (7% Solvesso 100 solution), 4.0 g. of Peerless 155 carbon black (Cities Service) were ball-milled for 15 days. To 3.83 g. of the concentrate was added 0.7 g. EA/EM/LM/LiSEM solution (14% solution). The mixture was then dispersed in Isopar-G by ultrasonic means. The images from this developer showed very high resolution and good overall quality. The second-generation process, however, produced images with extremely high contrast and thus did not produce acceptable continuous tone prints.

EXAMPLE 24

In 41.7 g. VT/LM/LiM/MA (7% solution), 3.0 g. of Indofast Blue (B-450 of Harmon Colors) pigment were ball-milled for 15 days. The images from the resulting developer exhibited high quality and good resolution. However, the second-generation diazo process produced no image since actinic light was not absorbed by this pigment.

EXAMPLE 25

A concentrated liquid toner was prepared by ball-milling 3.0 g. of the pigment of Example 10 in a 7% Solvesso 100 solution of 3.9 g. of VT/LM/LiM/MA (1.0 to 1.3 pigment-to-polymer ratio). A liquid toner was then obtained by adding to an aliquot of the concentrate to yield 0.35 g./l. pigment content the EA/EM/LM/LiSEM binder solution such to obtain 1/1.3/0.5 pigment-to-stabilizer-to-binder ratio, and diluting the mixture to 1 liter with Isopar-G under ultrasonic shear.

The resultant developer had particle size ≦2μ, was positively charged and, when used in the conventional electrophotographic process, provided excellent, neutraltoned images.

EXAMPLE 26

From the concentrate described in Example 27, another liquid toner was obtained by replacing the poly EA/EM/LM/LiSEM binder with chlorinated polyethylene solution at 1/1.3/0.5 pigment-to-stabilizer-to-binder ratio. The final developer was negatively charged, well-dispersed and yielded excellent, neutral images.

EXAMPLE 27

A concentrated liquid toner using the pigment of Example 11 was prepared by ball-milling 3.0 g. of the pigment as in Example 27. A diluted developer at 0.35 g./l. pigment content was obtained as in Example 27. Excellent-quality electrophotographic images were obtained.

EXAMPLE 28

A concentrated liquid toner was prepared by ball-milling 3.0 g. of the pigment of Example 14 in a 7% Solvesso 100 solution of 3.0 g. of poly VT/LM/LiM/MA at 1.0 to 1.0 pigment-to-polymer ratio. A working developer was then obtained as in Example 27. The electrophotographic images obtained were also of excellent quality.

Although the invention has been described in considerable detail with particular reference to certain preferred embodiments thereof, variations and modifications can be effected within the spirit and scope of the invention.

We claim:
1. An electrographic liquid developer comprising a liquid carrier having a dielectric constant of less than about 3 and having a volume resistivity of greater than about $10^{10}$ ohm-cm., and a marking particle comprising a dye having the formula

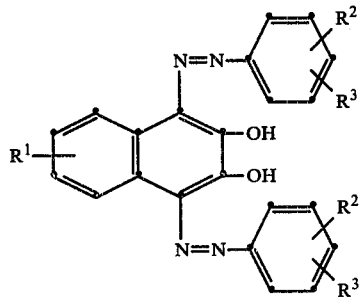

wherein:
$R^1$ is selected from the group consisting of a hydrogen atom, $-SO_2NH_2$ and $-SO_3M$, where M is $Na^+$ or $NH_4^+$;
$R^2$ is selected from the group consisting of lower alkoxy radicals having from 1 to about 4 carbon atoms, $-OCH_2CONH_2$ and

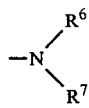

where each of $R^6$ and $R^7$ is selected from lower alkyl radicals having from 1 to about 4 carbon atoms; and
$R^3$ is selected from the group consisting of a hydrogen atom, lower alkyl radicals having 1 to about 4 carbon atoms, a halogen atom, $NO_2$ and lower alkoxy radicals having from 1 to about 4 carbon atoms.

2. The electrographic liquid developer of claim 1 wherein said dye is 1,4-bis[p-(N-ethyl-N-2-hydroxyethylamino) phenylazo]-2,3-naphthalenediol.

3. The electrographic liquid developer of claim 1 wherein said dye is 1,4-bis[4-(4-(N-ethyl-N-2-hydroxyethylamino) phenylazo]-2,3-dihydroxy-7-naphthalenesulfonic acid ammonium salt.

4. The electrographic liquid developer of claim 1 wherein said dye is 1,4-bis[4-N-ethyl-N-2-sulfoethylamino)-2-methylphenylazo]-2,3-naphthalenediol disodium salt.

5. The electrographic liquid developer of claim 1 wherein said dye is 2,3-dihydroxy-1,4-bis[4-(N-ethyl-N-2-sulfoethylamino)-2-methylphenylazo]7-naphthalenesulfonamide disodium salt.

6. The electrographic liquid developer of claim 1 wherein said dye is 1,4-bis(p-anisylazo)-2,3-naphthalenediol.

7. The electrographic liquid developer of claim 1 wherein said dye is 1,4-bis(o-anisylazo)-2,3-naphthalenediol.

8. The electrographic liquid developer of claim 1 wherein said dye is 1,4-bis(p-ethoxyphenylazo)-2,3-naphthalenediol.

9. The electrographic liquid developer of claim 1 wherein said dye is 1,4-bis(4-n-propoxyphenylazo)-2,3-naphthalenediol.

10. The electrographic liquid developer of claim 1 wherein said dye is 1,4-bis(p-anisylazo)-2,3-dihydroxynaphthalenesulfonic acid sodium salt.

11. The electrographic liquid developer of claim 1 wherein said dye is 1,4-bis(o-anisylazo)-2,3-dihydroxynaphthalenesulfonic acid sodium salt.

12. The electrographic liquid developer of claim 1 wherein said dye is 1,4-bis(4-anisylazo)-2,3-dihydroxy-6-naphthalenesulfonamide.

13. The electrographic liquid developer of claim 1 wherein said dye is 1,4-bis(4-carbamoylmethoxyphenylazo)-2,3-naphthalenediol.

14. The electrographic liquid developer of claim 1 wherein said dye is 1,4-bis(2-nitro-4-anisylazo)-2,3-naphthalenediol.

15. The electrographic liquid developer of claim 1 wherein said dye is 1,4-bis(5-nitro-2-anisylazo)-2,3-naphthalenediol.

16. An electrographic liquid developer comprising a liquid carrier having a dielectric constant of less than about 3 and having a volume resistivity of greater than about $10^{10}$ ohm-cm., and a marking particle comprising a dye having the formula:

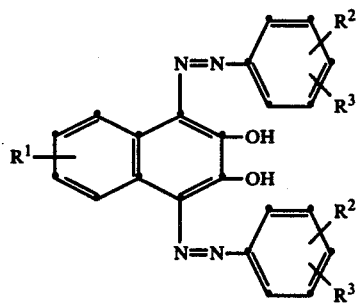

wherein:

$R^1$ is selected from the group consisting of a hydrogen atom, —SO$_2$NH$_2$ and —SO$_3$M where M is Na$^+$ or NH$_4^+$;

$R^2$ is selected from the group consisting of lower alkoxy radicals having from 1 to about 4 carbon atoms and —OCH$_2$CONH$_2$; and $R^3$ is selected from a hydrogen atom or NO$_2$.

17. The electrographic liquid developer of claim 16 wherein $R^2$ is a methoxy radical.

18. The electrographic liquid developer of claim 17 wherein $R^3$ is NO$_2$.

19. The electrographic liquid developer of claim 16 wherein $R^2$ is —OCH$_2$CONH$_2$.

20. The electrographic liquid developer of claim 16 wherein said marking particle further comprises a resinous material.

21. The electrographic liquid developer of claim 16 wherein said developer further comprises a charge agent.

* * * * *

UNITED STATES PATENT AND TRADEMARK OFFICE
CERTIFICATE OF CORRECTION

PATENT NO. : 4,145,299
DATED : March 20, 1979
INVENTOR(S) : John A. Ford, Jr., et al.

It is certified that error appears in the above-identified patent and that said Letters Patent are hereby corrected as shown below:

Column 12, Claim 3, line 2, "1,4-bis/4-(4-(N-ethyl-N-2-hydroxyethylamino)" should read --1,4-bis/4-(N-ethyl-N-2-hydroxyethylamino)--.

Signed and Sealed this

Twenty-fifth Day of September 1979

[SEAL]

Attest:

LUTRELLE F. PARKER
Attesting Officer
Acting Commissioner of Patents and Trademarks